W. J. BOLL.
LAWN MOWER ATTACHMENT.
APPLICATION FILED SEPT. 16, 1920.

1,399,601.

Patented Dec. 6, 1921.

WITNESSES
Geo. W. Naylor
Franklin J. Foster

INVENTOR
W. J. Boll
BY Munn & Co.
ATTORNEYS

UNITED STATES PATENT OFFICE.

WILLIAM J. BOLL, OF PLATTEVILLE, WISCONSIN.

LAWN-MOWER ATTACHMENT.

1,399,601.  Specification of Letters Patent.  Patented Dec. 6, 1921.

Application filed September 16, 1920. Serial No. 410,764.

*To all whom it may concern:*

Be it known that I, WILLIAM J. BOLL, a citizen of the United States, and a resident of Platteville, county of Grant, and State of Wisconsin, have invented a new and Improved Lawn-Mower Attachment, of which the following is a full, clear, and exact description.

This invention relates to improvements in lawn mower attachments, an object of the invention being to provide an improved means for adjusting the roller of a lawn mower. The invention is particularly designed for that type of mower, wherein the roller supports the blade carrying frame and by adjusting the roller the blades may be brought into close proximity to the ground to cut the grass short.

A further object is to provide a simple and practical roller adjusting mechanism, which will be strong and durable in use and which may be readily employed on various lawn mowers now on the market, without materially effecting the market price of the mower.

With these and other objects in view, the invention consists in certain novel features of construction and combinations and arrangements of parts, as will be more fully hereinafter described and pointed out in the claims.

Figure 1:
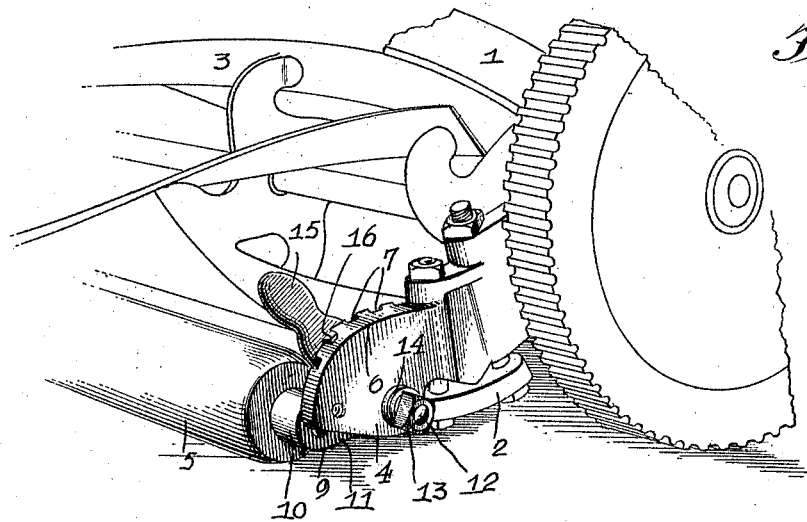
Figure 1 is a fragmentary perspective view of a lawn mower with my improved roller adjusting mechanism attached.
Figure 2:
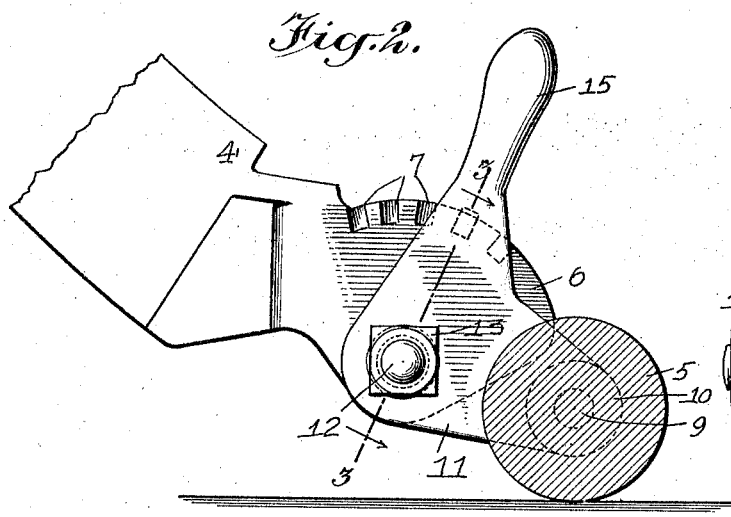
Fig. 2 is an enlarged view, partly in section, but mainly in elevation, on the line 2—2 of Fig. 4.
Figure 3:
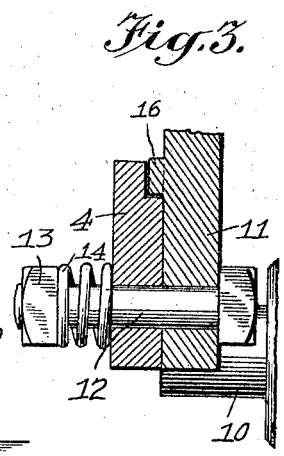
Fig. 3 is a view in transverse section on the line 3—3 of Fig. 2.
Figure 4:
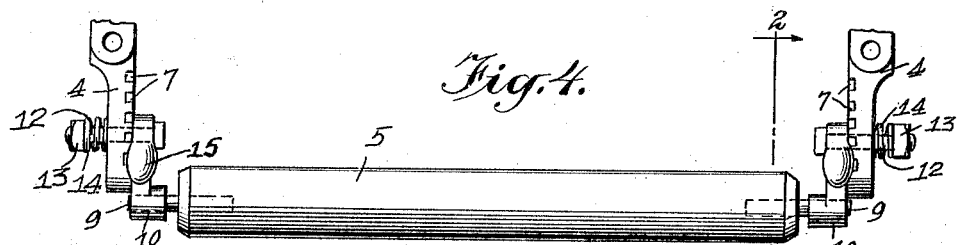
Fig. 4 is a top plan view of the roller and its associated parts.

Referring in detail to the drawings, 1 represents a well known type of lawn mower, which employs a fixed cutting blade 2 coöperating with a series of rotary blades 3 to sever the grass. In this form of mower, the rotary blades 3 and fixed blade 2, are both supported by a pair of rearwardly extending blade carrying frames such as 4, which are maintained off the ground by a roller 5. With my device, the rear portions of the frame members 4 include curved upper edges 6, which are provided on their inner faces with series of recesses or notches 7. The roller 5 includes at its ends outwardly extending trunnions 9. The trunnions 9 are loosely mounted at each end in bearing sleeves 10, made integral with adjusting members 11 in the form of plates. The plates 11 are positioned against the inner faces of the frame members 4 and pivotally connected thereto by means of bolts 12 and nuts 13. Coiled springs 14 are positioned around the bolts 12 between the nuts 13 and the outer faces of the frame members 4 and serve to maintain the plates 11 against the inner faces of the members 4.

Each member 11 is provided with a handle 15, and with a lug 16, adapted to engage in the notches 7, arranged in arc formation on the frame members 4.

The operation is as follows: In order to lock the roller 5 in position, the lugs 16 are positioned in corresponding notches 7 in the members 11. To regulate the depth of cutting, the handles are moved inwardly pulling the lugs 16 out of the notches 7 and the lugs may then be positioned in other of the notches serving to raise or lower the blades off the ground. As the handles 15 move rearwardly, the frames 4 are raised and the blades are lifted higher off the ground, as will be readily understood.

While I have illustrated one of the preferred embodiments of my invention, it is apparent that various slight changes and alterations might be made and therefore I do not limit myself to the precise construction shown, as variations may be made therefrom without departing from the spirit of my invention.

I claim:

1. In a lawn mower, a pair of rearwardly extending blade carrying frames, a roller, a pair of adjusting plates pivoted to the rear ends of the frames, said roller having bearings in said adjusting plates, interlocking devices carried by the adjusting plates and frames, and a spring normally retaining said devices in locked relationship.

2. In a lawn mower, a pair of rearwardly extending blade carrying frames, a pair of plates pivotally connected to the frames, a roller carried by the plate, interlocking devices integral with the members and frames, and springs normally maintaining said devices in locked relationship.

3. A roller adjusting attachment for lawn mowers, comprising a pair of roller carrying adjusting plates, handles and locking lugs on the roller carrying adjusting plates and the blade supporting frames of the mower having arc shaped series of recesses therein adapted to receive the lugs, said roller carrying adjusting plates pivotally connected to the blade supporting frames and springs maintaining the lugs in the recesses.

4. In a lawn mower, a pair of rearwardly extending frames, plates pivoted to the frames, lugs on the plates, said frames having arcuate series of recesses therein adapted to selectively receive the lugs, springs normally retaining the lugs in the recesses, and a roller carried by the plates.

5. In a lawn mower, a pair of rearwardly extending frames, plates pivoted to the frames, lugs on the plates, said frames having arcuate series of recesses therein adapted to selectively receive the lugs, springs normally retaining the lugs in the recesses, said plates including integral bearing sleeves, a roller, trunnions on the roller having bearings in said sleeves.

6. In a lawn mower, a pair of rearwardly extending blade carrying frames having series of recesses therein, plates, lugs on the plates selectively engageable in the recesses, bolts pivotally connecting the plates and frames, springs around the bolts normally maintaining the lugs in the recesses, and a roller carried by the plates.

WILLIAM J. BOLL.